United States Patent [19]

Nodiff

[11] 4,160,064
[45] Jul. 3, 1979

[54] EPOXY ADHESIVE SEALANT

[75] Inventor: Edward A. Nodiff, Philadelphia, Pa.

[73] Assignee: Theodore R. Flint, Valley Forge, Pa.

[21] Appl. No.: 806,279

[22] Filed: Jun. 15, 1977

[51] Int. Cl.$^2$ .................. B32B 27/38; D06P 3/00; D06P 5/00

[52] U.S. Cl. .................. 428/413; 260/37 EP; 260/18 PN; 8/4; 8/DIG. 8; 428/913; 428/40; 428/207

[58] Field of Search .................. 260/37 EP, 18 PN; 428/413, 414, 415, 416, 417, 418; 8/4, 73, DIG. 8

[56] References Cited

U.S. PATENT DOCUMENTS

| 3,030,329 | 4/1962 | Warnsdorfer, Jr. | 260/37 EP |
|---|---|---|---|
| 3,708,379 | 1/1973 | Flint | 428/58 |
| 3,773,706 | 11/1973 | Dunn, Jr. | 260/37 EP |
| 3,837,981 | 9/1974 | Flint | 428/375 X |
| 4,013,747 | 3/1977 | Hampel | 260/37 EP X |

OTHER PUBLICATIONS

Merck Index, p. 1071, 9th Edition, Published 1976.

Primary Examiner—George F. Lesmes
Assistant Examiner—Daniel R. Zirker, Jr.
Attorney, Agent, or Firm—Steele, Gould & Fried

[57] ABSTRACT

An epoxy adhesive sealant composition comprised of an uncured epoxy resin composition and a composition capable of curing the epoxy resin composition, one of said compositions containing a coloring agent effective to impart latently transient color to said composition unlike the color of the non-colored composition. Substantially equal amounts of each of said compositions are combined to form a substantially uniformly colored composition which becomes essentially colorless with curing of the epoxy resin composition.

15 Claims, No Drawings

EPOXY ADHESIVE SEALANT

BACKGROUND OF THE INVENTION

U.S. Pat. Nos. 3,708,379 and 3,837,981 describe elastomeric tape and epoxy tape, respectively. The epoxy tape of the latter patent is marketed commercially as an adhesive sealant for a wide variety of applications. The commercial from of epoxy tape has a band of uncured epoxy ribbon which is brilliant deep blue in close side-by-side relation with a band of a curing composition which is yellow.

When portions of the epoxy resin band and curing composition band are mixed prior to application, the striking contrast in color between the bands serves as a mixing indicator, denoting complete mixing of the two components when a uniform color is obtained. In the commercial embodiment, mixing of the epoxy resin component, and curing agent component produces a green mixture which cures to form a green epoxy adhesive sealant. The green color of the cured epoxy adhesive sealant is acceptable in many applications; however, as might be imagined, there are environments where a green adhesive sealant is not acceptable from an esthetic point of view. Of course, other pigments can be used in the respective components of the epoxy tape composition with resultant adhesive sealants having colors other than green, the only requirement being that there be sufficient color contrast between the two components prior to mixing so that it is easy to determine when uniform mixing of the epoxy resin and curing composition has occurred.

A need exists for an epoxy adhesive sealant having all the beneficial attributes of the product described in U.S. Pat. Nos. 3,708,379 and 3,837,981, and which cures to form an adhesive-sealant which is colorless or white. Those in the art will appreciate that a white pigment such as titanium dioxide could be included in the epoxy resin composition and/or the curing agent composition described in U.S. Pat. No. 3,837,981 in a quantity sufficient to render each component white. However, there would be very little, if any, contrast in color between the respective bands, and hence minimal color change would occur on mixing of the two components. Thus, there would be no sharp indication that the components had been sufficiently mixed so as to provide a curable epoxy adhesive sealant, and such a product would be unsatisfactory for this reason.

The object of this invention is to provide an epoxy adhesive sealant which will cure to form an essentially colorless epoxy adhesive sealant. A further object is to provide an uncured epoxy adhesive sealant in which there is contrast in color between the epoxy resin composition and the curing composition which is obtained by including a coloring agent in one of the compositions, a coloring agent which will serve as an indicator that the components have been properly mixed so as to provide a curable epoxy adhesive system, and yet provide an ultimate epoxy adhesive sealant which is essentially colorless or white in its cured state.

DETAILED DESCRIPTION OF THE INVENTION

This invention relates to an improved epoxy adhesive sealant comprising an uncured epoxy resin composition, a composition capable of curing said epoxy resin when said epoxy resin and said curing composition are combined to form a substantially uniform mixture, improved whereby said uncured epoxy resin composition contains a coloring agent effective to impart latently transient color to said epoxy resin composition which contrasts with the color of said curing composition, said colored epoxy resin composition forming a substantially uniformly colored composition when combined with said curing composition to form a substantially uniform mixture, said uniformly colored composition becoming essentially colorless with curing of the epoxy resin composition.

Color is psychophysical, representing a mental response to a stimulus on the human retina and the subsequent development of the corresponding sensation recognized as color. It is not necessary to delve into the theories of color, nor is it necessary to consider sophisticated measurements of color intensity in order to appreciate this invention. However, because the word "color," and other words based thereon such as "colorless" and "decolorized" are used with frequency in the specification and claims, and may have different meanings to different people, an explanation of the manner in which these words are used herein is given. "Color" is a general term applied to the property of things seen or distinguished by the visual sense as red, yellow, blue, green, and so on as distinguished from things seen as white or gray. "Decolorized" is to remove color, "colorless" is lacking color, and is synonymous with "white" meaning free of color or achromatic.

The product of this invention represents an improvement of the epoxy tape described in U.S. Pat. No. 3,837,981 which is incorporated herein by reference. The product has two principal components, namely an uncured epoxy resin composition containing a coloring agent effective to impart latently transient color thereto, and a curing composition for the epoxy resin. The epoxy resins which may be employed are well known, and include those described in U.S. Pat. No. 3,837,981. Likewise, the curing systems for the uncured epoxy resin are well known, and are disclosed in the aforementioned patent. The uncured epoxy resin and the curing system components may be combined with a variety of fillers, plasticizers, and the like to provide compositions having physical properties and characteristics such that they may be formulated into stable easily extruded and packaged products. Desirable fillers, plasticizers, and the like are also described in U.S. Pat. No. 3,837,981. While this application makes particular reference to the product described in the aforementioned patent, the invention is not limited to epoxy adhesive sealants in tape form, and is equally applicable to epoxy adhesive sealants in which the uncured epoxy resin and curing system components are in the form of bars, slugs, liquids and the like.

According to one aspect of the present invention, the epoxy adhesive sealant of U.S. Pat. No. 3,837,981 is improved with addition of latently transient color to the epoxy resin composition. The color imparted to the epoxy resin composition serves to provide a contrast in color between the epoxy resin and curing system components of the epoxy adhesive sealant. The contrast in color between the two components facilitates use of the adhesive sealant as it makes it easy to determine when uniform mixture of the epoxy resin system and the curing composition has been obtained simply by mixing until the combined components have a uniform color. However, while the color imparted to the epoxy resin composition in accord with the present invention serves the foregoing function, it also differs in kind and effect from colorants included in the epoxy resin and curing system composition described in U.S. Pat. No. 3,837,981.

It has been determined now that coloring agents, specifically, certain dyes, may be incorporated in the epoxy resin composition and are effective to impart latently transient color to the epoxy resin composition which contrasts with the color of the curing composition. The colored epoxy resin composition and curing composition form a substantially uniformly colored mixture when combined in a substantially uniform mixture, the latently transient color of the uniformly colored mixture becoming essentially colorless or white with curing of the epoxy resin composition. The expression "latently transient color" as used in the specification and claims, refers to color which hereinafter identified coloring agents impart to the epoxy resin component which color is stable and of any desired hue, that color, however, remaining stable only so long as the colored epoxy resin composition is not combined with the curing composition with which it is associated; and, when combined with the curing composition, is further characterized by fugitive tendencies, in that the color of the combined epoxy resin and curing composition decolorizes becoming essentially colorless or white with curing of the epoxy resin composition. Decolorization begins on initial mixing of the epoxy resin composition and the curing composition, continues as a uniform mixture of the two components is achieved, generally is complete within a few minutes after mixture of the two components, but in any event, is complete on curing of the epoxy resin composition.

A variety of coloring agents may serve to impart the desired latently transient color to the epoxy adhesive sealant of the invention. Generally speaking, however, dyes classified in the *Color Index* as "basic dyes" are suitable. Members of the basic dye family meet several criteria found necessary to impart latently transient color to epoxy resin adhesive sealants in that they provide attractive, stable color when combined with epoxy resin compositions and have sufficient color intensity so that small quantities of dye suffice to color large quantities of epoxy resin composition. Importantly, basic dye members undergo rapid color change when the epoxy resin composition of which they are a part is combined with a curing composition, serving first to indicate that uniform mixing of the epoxy resin and curing composition has occurred, and ultimately decolorizing to become essentially colorless or white with curing of the epoxy resin. The fugitive nature of basic dyes is independent of the intensity of ambient light, that is, light is not required to effect decolorization, although light may, in some instances, assist decolorization. The change in color of the basic dye to colorless or white which occurs on combining of the dyed epoxy resin composition and curing composition is generally permanent. Moreover, members of the basic dye family are readily available at relatively low price, are compatible with other ingredients in the epoxy adhesive sealant, and have no deleterious effect on the cured epoxy adhesive sealant.

The genus, basic dyes, has well recognized species which include azine, thiazine, oxazine, xanthene, monoaso, azo, diarylmethane, triarylmethane, anthraquinone, polymethine, cyanine, thiazole and quinoline dyes. Specific dyes in each of these species of basic dyes have been found useful in the present invention, and, therefore, with certain caveats, it may be stated properly that the family of dyes known as basic dyes is effective to impart the desired latently transient color to the improved epoxy adhesive sealant of this invention. The caveats to this proposition are that for some reason certain specific basic dyes, identified in Table I, below have been found not to impart the latently transient color described herein when incorporated in epoxy resin compositions. Moreover, new dyes of all types, including basic dyes, are being developed constantly. It is possible that certain newly developed dyes will likewise not be effective to impart latently transient color to epoxy adhesive sealants, despite their classification as basic dyes. Similarly, certain dyes in the genus vat dyes have been found useful; however, as in the case of basic dyes there are vat dyes which are not effective to impart latently transient color to epoxy adhesive sealants. On the other hand, the vat majority of dyes in the genera reactive, mordant, disperse, direct, acid, and solvent dyes have been found not to impart the latently transient color described herein when incorporated in epoxy resin compositions, although there are isolated dyes in these genera which exhibit the necessary properties for use in the present invention. The following table identifies basic dyes which are efective to impart latently transient color to epoxy adhesive sealants, and also identifies basic dyes not useful in the present invention. Table I also identifies vat dyes effective to impart latently transient color to epoxy adhesive sealants, and vat dyes not useful in the present invention.

Table I

A. Basic Yellow Dyes

| Color Index No. | Specie | Color (In Epoxy Resin) | Color of Curing-Cured Adhesive Sealant |
|---|---|---|---|
| 1 | thiazole | yellow | I |
| 2 | diarylmethane | " | II |
| 11 | methine | " | I |
| 13 | cyanine | orange | I |
| 14 | methine | yellow | I |
| 15 | monoazo | orange | III |
| 19 | monoazo | yellow | II |
| 21 | polymethine | " | I |
| 25 | azo | " | II |
| 28 | methine | " | IV |
| 29 | methine | " | IV |
| 31 | quinoline | orange | IV |
| 36 | azo | yellow | II |
| 40 | methine | orange | II |
| 41 | azo | " | IV |
| 50 | monoazo | " | II |
| 52 | methine | " | I |
| 53 | " | yellow | I |
| 63 | " | " | I |
| 64 | " | " | I |

B. Basic Orange Dyes

| Color Index No. | Specie | Color (In Epoxy Resin) | Color of Curing-Cured Adhesive Sealant |
|---|---|---|---|
| 1 | monoazo | yellow | IV |
| 2 | monoazo | orange | IV |
| 21 | methine | " | IV |
| 22 | " | " | I |
| 24 | monoazo | brown | IV |
| 26 | " | " | II |
| 27 | methine | orange | II |
| 28 | monoazo | " | II |
| 30 | " | brown | II |
| 31 | " | orange | IV |
| 37 | azo | " | II |
| 38 | azo | " | IV |
| 39 | monoazo | " | III |
| 43 | " | " | IV |
| 44 | methine | " | II |

Table I-continued

| | | | |
|---|---|---|---|
| 54 | azo | " | IV |

C. Basic Red Dyes

| Color Index No. | Specie | Color (In Epoxy Resin) | Color of Curing-Cured Adhesive Sealant |
|---|---|---|---|
| 1 | xanthene | red | II |
| 2 | azine | purple | IV |
| 13 | methine | blue-red | I |
| 14 | cyanine | red | I |
| 15 | methine | red | I |
| 17 | monoazo | orange | IV |
| 18 | " | red | IV |
| 22 | azo | " | IV |
| 23 | monoazo | " | II |
| 27 | methine | " | I |
| 29 | monoazo | " | II |
| 30 | " | " | IV |
| 36 | methine | " | I |
| 38 | azo | " | II |
| 44 | " | " | IV |
| 46 | monoazo | orange | II |
| 49 | methine | red | I |
| 50 | azo | " | II |
| 54 | monoazo | orange | IV |
| 60 | " | " | IV |
| 65 | " | purple | I |
| 73 | " | orange | IV |

D. Basic Violet Dyes

| Color Index No. | Specie | Color (In Epoxy Resin) | Color of Curing-Cured Adhesive Sealant |
|---|---|---|---|
| 1 | triarylmethane | violet | II |
| 2 | " | red violet | II |
| 3 | " | violet | I |
| 7 | methine | red-blue | I |
| 10 | xanthene | red-blue | IV |
| 11 | xanthene | red-blue | I |
| 14 | triarylmethane | violet | I |
| 15 | methine | " | I |
| 16 | " | " | I |
| 20 | polymethine | " | I |
| 25 | anthraquinone | purple | I |
| 27 | methine | red-blue | I |
| 28 | azo | violet | II |
| 35 | " | " | IV |
| 66 | | blue | I |

E. Basic Blue Dyes

| Color Index No. | Specie | Color (In Epoxy Resin) | Color of Curing-Cured Adhesive Sealant |
|---|---|---|---|
| 1 | triarylmethane | blue | I |
| 3 | oxazine | " | II |
| 5 | triarylmethane | " | I |
| 6 | oxazine | " | IV |
| 7 | triarylmethane | " | I |
| 9 | thiazine | " | II |
| 21 | anthraquinone | " | IV |
| 22 | " | " | IV |
| 26 | triarylmethane | " | I |
| 35 | anthraquinone | " | III |
| 41 | monoazo | violet | I |
| 45 | anthraquinone | " | IV |
| 47 | " | " | IV |
| 54 | monoazo | " | I |
| 57 | " | " | I |
| 60 | anthraquinone | " | IV |
| 62 | methine | " | I |
| 67 | azo | " | I |
| 68 | " | " | I |
| 69 | methine | " | II |
| 75 | oxazine | " | IV |
| 77 | triarylmethane | " | III |
| 80 | anthraquinone | " | II |
| 94 | " | " | III |
| 95 | oxazine | " | II |

F. Basic Green Dyes

| Color Index No. | Specie | Color (In Epoxy Resin) | Color of Curing-Cured Adhesive Sealant |
|---|---|---|---|
| 1 | triarylemethane | green | I |
| 4 | " | " | I |
| 6 | quinoline | " | I |

G. Basic Black Dyes

| Dye | Color (In Epoxy Resin) | Color of Curing-Cured Adhesive Sealant |
|---|---|---|
| Astrazon Black WRL* | green | II |
| Astrazon Black MF D/L* | " | II |
| Astrazon Black M* | black | II |
| Astrazon Printing Black P* | " | I |
| Astrazon Black R* | black | IV |
| Atacryl Black II** | green | IV |

H. Blue Vat Dyes

| Color Index No. | Specie | Color (In Epoxy Resin) | Color of Curing-Cured Adhesive Sealant |
|---|---|---|---|
| 1 | indigo | blue | II |
| 6 | Mayvat Blue BFC Supra*** | blue | II |
| 18 | Mayvat Navy Blue BN-NM Supra*** | dark gray | II |
| 20 | Mayvat Dark Blue BO*** | dark gray | II |

I. Yellow Vat Dyes

| Color Index No. | Specie | Color (In Epoxy Resin) | Color of Curing-Cured Adhesive Sealant |
|---|---|---|---|
| 2 | Mayvat Flavone GC* | yellow | II |
| 33 | anthraquinone | yellow | IV |

*Verona Dyestuff Division, Mobay Chemical Co.
**Atlantic Chemical Corporation
***Otto B. May Company

J. Orange Vat Dyes

| Color Index No. | Specie | Color (In Epoxy Resin) | Color of Curing-Cured Adhesive Sealant |
|---|---|---|---|
| 1 | Mayvat Golden Yellow RK | orange | IV |
| 7 | anthraquinone | orange | III |

K. Red Vat Dyes

| Color Index No. | Specie | Color (In Epoxy Resin) | Color of Curing-Cured Adhesive Sealant |
|---|---|---|---|
| 1 | Hostavat Brill. Pink R Ultra Paste* | red | IV |
| 10 | Mayvat Red FBB** | red | IV |
| 15 | Mayvat Bordeaux HRR** | red | IV |

L. Violet Vat Dyes

| Color Index No. | Specie | Color (In Epoxy Resin) | Color of Curing-Cured Adhesive Sealant |
|---|---|---|---|
| 1 | Mayvat Brill. Violet 4R** | violet | III |
| 9 | Mayvat Brill. Violet 3B** | violet | IV |

M. Green Vat Dyes

| Color Index | Color (In Epoxy | Color of Curing-Cured Adhesive |

Table I-continued

| No. | Specie | Resin) | Sealant |
|---|---|---|---|
| 1 | Mayvat Brill. Green Supra B. Dbl. Paste** | green | III |
| 3 | Mayvat Green BBL** | green | II |

*American Hoechst Company
**Otto B. May Company

In Table I, the classification of color of the curing-cured adhesive sealants as members of classes I, II, III or IV respectively, represents an arbitrary, visual classification only. Categorization as a member of Class I, means that the dye imparts a rich color to the epoxy resin composition and decolorizes when the epoxy resin composition and curing composition are combined and curing occurs forming colorless or white adhesive sealant. Dyes categorized in Class II likewise impart rich color to the epoxy resin composition and decolorize on combining and curing of the epoxy resin composition and curing composition; however, the ultimate adhesive sealant is something less than colorless or white, having a pale gray color or a pale shade of their original color. Use of lower concentrations of Class II dyes in the epoxy resin composition could produce a cured composition in which the dye is decolorized as in Class I. Dyes categorized in Class III impart only a pale or dull color when combined with the epoxy resin composition and decolorize on combining and curing of the epoxy resin composition and curing composition, however, because the dye imparts only an initial pale dull color to the epoxy resin composition, the contrast in color between the epoxy resin composition and the curing composition is not as striking as in the case of dyes in Class I and II. A dye categorized in Class IV does not decolorize when the epoxy resin is combined with the curing composition or is inadequate to impart sufficient color to the epoxy resin composition, hence Class IV dyes are not useful in the present invention. Generally speaking, basic dyes of the methine, triarylmethane and azo species are preferred dyes for use in the present invention.

The basic dye effective to impart latently transient color to the epoxy adhesive sealant of this invention is incorporated in the epoxy resin component in the amount of 0.02% to about 5.00%, preferably about 0.15% to about 0.35%, by weight, based on the weight of the epoxy resin composition. The amount of dye used will vary with the coloring power of the dye, the intensity of color desired in the epoxy resin composition, and the rate at which the dye decolorizes when combined with the curing composition.

The basic dyes are not effective to impart latently transient color to the epoxy adhesive sealant of this invention if incorporated in the curing composition. It will be recognized by those in the art, however, that there may be coloring agents which could be color stable when incorporated in the curing composition and could decolorize on reaction with an epoxy resin composition. No dyes have been found which act in this manner.

Since a principal object of this invention is to provide an epoxy adhesive sealant which is essentially colorless or white in its cured state, it is preferable to include pigments such as titanium dioxide in the curing composition. In this manner, the curing composition is white prior to mixing with the epoxy resin composition, and provides desired contrast in color with the epoxy resin composition colored with a latently transient basic dye. The amount of white pigment, e.g. titanium dioxide, included in the curing composition is not critical, and may vary with the amount of basic dye incorporated in the epoxy resin composition with which it will ultimately be combined. Another way in which to describe the amount of basic dye and pigment to be included in the epoxy resin composition and curing composition, respectively, is in terms of providing sufficient dye and pigment so that there will be a sharp contrast in color between the two principal components in their uncured state and so that the cured epoxy adhesive sealant will be essentially the color of the curing composition prior to mixing and curing, i.e., colorless or white, or the color of the mixture of the curing composition and undyed epoxy resin composition.

The improved epoxy adhesive sealants of this invention may be prepared in the manner described in U.S. Pat. No. 3,837,981. In preparing the epoxy adhesive sealants of this invention in tape form, such as illustrated in FIGS. 1 and 2 of that patent, the epoxy resin composition and curing composition are prepared separately by mixing together the constituents of each composition, and the separate mixtures are extruded through a co-extrusion die.

Epoxy resins desirable for use in the present invention include solid epoxy resins having an epoxy equivalent weight of about 385 to about 500, and a melting point of from about 60 to 75° C.; liquid epoxy resins having an epoxy equivalent weight ranging from about 185 to about 200 and a viscosity ranging from about 120 to about 160 poises at 25° C; and semisolid epoxy resins having an epoxy equivalent weight ranging from about 650 to about 750 and a kinematic viscosity (viscosity of solution containing 75%, by weight, of the epoxy resin in xylene), of 15 to 25 poises at 25° C. Epoxy resins having an epoxy equivalent weight of about 140 to about 180 may also be utilized; however, they are not preferred, since they may be dermatitic and tend to produce a loose and sticky epoxy putty. Mixtures of epoxy resins having a kinematic viscosity ranging from about 0.01 to about 10 poises at 25° C. such as are formed when from about 50 parts to about 300 parts of a solid epoxy resin such as that described above are combined with about 100 parts of a liquid epoxy resin such as that defined above, may also be utilized.

A desirable curing system for the epoxy resin comprises a semi solid resinous polyamide having a viscosity of about 5 to about 80, preferably about 10 poises at 150° C., and an amine value ranging from about 85 to 95. Mixtures of this polyamide resin with lower viscosity and more reactive resins such as those having a viscosity of about 5 to about 100; preferably about 35 poises at 75° C. and an amine value ranging from about 230 to about 380 may also be utilized. Resins of these types are available commercially under the trademark VERSAMID from General Mills. In general, a blend of polyamide resins utilized in the epoxy adhesive sealant of this invention should have an amine value ranging from about 90 to 375 and a viscosity of 5 to 80 poises at 150° C.

To accomplish satisfactory curing of the epoxy resin there should be a sufficient amount of the curing agent in the curing system to crosslink at least about 70 to about 150%, preferably about 100%, of the available crosslinking sites in the epoxy resin in the epoxy adhesive sealant. Curing to this extent can be achieved with the use of from about 40 to about 150, preferably about 100, parts of a polyamide curing agent per 100 parts of epoxy resin in the epoxy adhesive sealant.

The epoxy resin and the polyamide resin curing agents therefor are admixed with various fillers and plasticizers to form respective putty-like compositions which are extruded to form the epoxy tape. Useful fillers include talc, and powdered alumina. Fillers such as these provide the epoxy resin and the polyamide resin composition with the physical properties necessary for extrusion into the tape form, and also enhance the properties of the cured system. The fillers are incorporated into the epoxy resin and polyamide resin compositions in amounts sufficient to provide a putty-like mass which easily can be extruded into the desired epoxy tape. Finely powdered talc such as Mistron Vapor ® of Cyprus Industrial Minerals Co. is an especially preferred filler, since it is a pure white talc containing no asbestos and it produces a handleable putty-like mass with both epoxy resins and polyamide resins. The putty-like masses prepared with this filler show less tendency to stick to the hands than do putty-like masses prepared with other fillers. Plasticizers include resinous polyols and other agents which serve to soften the cured epoxy tape.

In use, substantially equal portions of the epoxy resin composition and the polyamide curing composition are selected, e.g. by taking substantially equal lengths of each band of the epoxy tape, and the portions are mixed together by hand or machine. The mixing permits the components of the polyamide curing system to react with the epoxy resin composition, effecting curing in situ. Also, when mixing occurs, the basic dye component of the epoxy resin composition exhibits its fugitive tendencies, and, as the epoxy resin composition cures, it becomes essentially white in color and retains its white color throughout the life of the adhesive sealant produced. Since the epoxy resin composition and the polyamide curing system are of contrasting color, it is easy to determine when a uniform mixture of the two has been obtained simply by continuing mixing until the mixture has a uniform color. The epoxy material formed on combining equal portions of the epoxy resin composition and the polyamide curing composition has a useable pot life of approximately 4 hours, and will fully cure to a useful, tough solid essentially white epoxy adhesive in about 24 hours. The epoxy adhesive sealant has excellent properties, and may be used to secure ceramic, wood, and metal and like materials, to aluminum, concrete, steel, ceramic and like substrates.

The epoxy composition will cure at ambient temperatures; however, curing will be accelerated at elevated temperatures. Moreover, the epoxy composition will cure under water making it useful in many marine environments.

As mentioned above, the epoxy resin composition and the polyamide curing system may be formulated in tape form, as by extrusion through a co-extrusion die in which the epoxy resin composition and the polyamide curing system are formed into respective bands in side-by-side relationship to form a tape. Any desired length of tape made up of bands of the epoxy resin composition and the polyamide curing system may be simply rolled up and packaged in any desired manner. There is no need for special packaging requirements to give shelf life to the tape. In the event basic dyes are used which demonstrate sensitivity to ambient light, special packaging such as tin foil which excludes light from the product would preclude premature decolorization.

The following Examples are set forth as illustrative of the invention:

EXAMPLE 1

An epoxy resin composition is formed of 47 parts of a semisolid epoxy resin (Epon 872 of Shell Chemical Co.) melted at about 55° C. and poured into a standard double arm mixer. 2.3 parts of dibutyl phthalate plasticizer having 0.4 parts Astrazon Blue 5RL (Color Index Basic Blue 62) dye obtained from Verona Dyestuff Division, Mobay Chemical Co., dispersed therein is added to the melted epoxy resin and mixed until a uniform brilliant royal blue color is produced. 50.3 parts of powdered talc is added and mixed slowly until fully dispersed, the mixture maintaining a brilliant royal blue color. The epoxy resin composition is formed in 1" diameter cords, dusted with corn starch, coiled on release paper and stored for subsequent coextrusion with the polyamide curing composition.

The polyamide curing composition is formed by adding 26.2 parts of a liquid polyamide resin (Versamid 215 of General Mills) in a standard double arm mixer and combining therewith 15.3 parts of Versamid 100 previously melted at 140° F. 9.9 parts of pigment grade titanium dioxide is added to the solution of Versamid 215 and Versamid 100 and mixed until a uniform white mass is achieved. 48.6 parts of powdered talc is then added and mixed continuously until fully dispersed in the polyamide composition. The polyamide composition is formed into cords similar to those formed from the epoxy composition for subsequent coextrustion with the epoxy resin composition.

Equal portions, by weight, of the brilliant royal blue epoxy resin composition and the white polyamide curing composition are coextruded through twin extruders feeding a coextrusion die which continuously and simultaneously lays down a band of each mixture in side-by-side relationship onto a moving strip of transparent release paper. The tape formed is usually extruded in a form about 1" wide and ⅛" thick. Tapes are cut to desired lengths, rolled up on release paper and packaged as conventional tapes in blister packages or other suitable containers.

Any quantity of tape is removed from the roll, separated from the release paper, and kneaded by hand or machine to form a light blue uniformly colored mass. The uniform light blue color indicates thorough mixing and thereafter the mixture may be applied for any desired adhesive sealant use. In no more than about fifteen minutes the light blue color of the mixture of epoxy resin and polyamide composition will fade away leaving a permanent white adhesive sealant.

Following the procedure outlined above additional epoxy adhesive sealant compositions are formed by substituting the dyes enumerated for the Astrazon Blue 5RL dye:

A 0.5 parts Genacryl Blue 6C (Color Index Basic Blue 1)
B. 0.38 parts Genacryl Orange R (Color Index Basic Orange 22)
C. 0.25 parts Astrazon Brilliant Red 4G (Color Index Basic Red 14)

In the case of dye A, the epoxy resin composition is aquamarine, and the adhesive-sealant formed on combining the epoxy resin composition with polyamide composition is white. In the case of dye B, the epoxy resin composition is orange, and the adhesive sealant formed on combining the epoxy resin composition with the polyamide composition is white. In the case of dye C, the epoxy resin composition is red, and the adhesive sealant formed on combining the epoxy resin composition with the polyamide composition is white.

EXAMPLE 2

Epoxy resin compositions of Example 1 are prepared by substituting varying amounts of Genacryl Orange R dye (Color Index Basic Orange 22) for Astrazon Blue 5RL dye. In each case an adhesive sealant is formed on combining the dyed epoxy resin composition with an equal amount by weight of the polyamide composition in claim 1.

| Epoxy Resin Composition | Parts Genacryl Orange in Resin Composition | Color of Cured Epoxy Adhesive-Sealant |
|---|---|---|
| A | 0.25 | white |
| B | 0.5 | off-white |
| C | 1 | pale pink |
| D | 2 | pale pink |
| E | 5 | pink |

What is claimed is:

1. In a putty-like epoxy adhesive sealant comprising a first band of an uncured epoxy resin composition and a second band, said second band comprising a composition capable of curing of said epoxy resin when said first and second bands are combined to form a substantially uniform mixture, the improvement wherein said uncured epoxy resin composition contains from about 0.02 to about 5%, by weight, of a coloring agent effective to impart latently transient color to said epoxy resin composition which contrasts with the color of said curing composition, said colored epoxy resin composition forming a substantially uniformly colored composition when said epoxy resin composition and said curing composition are combined to form a substantially uniform mixture, said uniformly colored composition becoming essentially colorless with curing of said epoxy resin composition.

2. The epoxy adhesive sealant of claim 1 wherein the uniformly dyed composition formed when said colored epoxy resin composition and curing composition are combined becomes essentially white with curing of said epoxy resin composition.

3. The epoxy adhesive sealant of claim 1 wherein said coloring agent is a basic dye.

4. The epoxy adhesive sealant of claim 3 wherein said epoxy resin composition contains from about 0.15 to about 0.35%, by weight, of said basic dye.

5. The epoxy adhesive sealant of claim 4 wherein said basic dye is a member of the group consisting of CI basic yellow 1, 2, 11, 13, 14, 15, 19, 21, 25, 36, 40, 50, 52, 53, 63 and 64.

6. The epoxy adhesive sealant of claim 4 wherein said basic dye is a member of group consisting of CI basic orange 22, 26, 27, 28, 30, 37, 39 and 44.

7. The epoxy adhesive sealant of claim 4 wherein said basic dye is a member of the group consisting of CI basic red, 1, 13, 14, 15, 23, 27, 29, 36, 38, 46, 49, 50 and 65.

8. The epoxy adhesive sealant of claim 3 wherein said basic dye is a member of the group consisting of CI basic violet 1, 2, 3, 7, 11, 14, 15, 16, 20, 25, 27 28 and 66.

9. The epoxy adhesive sealant of claim 7 wherein said basic dye is a member of the group consisting of CI basic blue 1, 3, 5, 7, 9, 22, 26, 35, 41, 54, 57, 62, 67, 68, 69, 77, 80, 94 and 95.

10. The epoxy adhesive sealant of claim 3 wherein said basic dye is a member of the group consisting of CI basic green 1, 4 and 6.

11. The epoxy adhesive sealant of claim 3 wherein said basic dye is a black dye selected from the group consisting of Astrazon Black WRL, Astrazon Black MF D/L Astrazon Black M, and Astrazon Printing Black P.

12. The epoxy adhesive sealant of claim 3 wherein said basic dye is a member of the group consisting of Astrazon Blue 5RD, Genecryl Blue 6G, Genacryl Orange R and Astrazon Brilliant Red 4G.

13. The epoxy tape adhesive sealant of claim 3 wherein said basic dye is a member of the group consisting of methine, triarylmethane, and azo basic dyes.

14. The epoxy adhesive sealant of claim 1 wherein said coloring agent is a vat dye.

15. The epoxy adhesive sealant of claim 1 wherein the uniformly colored composition formed when said dyed epoxy resin composition and said curing composition are combined to form a substantially uniform mixture becomes essentially decolorized and acquires the color of the curing composition with curing of the epoxy resin composition.

* * * * *

UNITED STATES PATENT OFFICE
CERTIFICATE OF CORRECTION

Patent No. 4,160,064      Dated July 3, 1979

Inventor(s) Edward A. Nodiff

It is certified that error appears in the above-identified patent and that said Letters Patent are hereby corrected as shown below:

| | | | |
|---|---|---|---|
| Col. 1, l. 9 | "from" | should be | -- form --. |
| Col. 4, l.17 | "vat" | should be | -- vast --. |
| Col. 10, l. 59 | "6C" | should be | -- 6G --. |
| Claim 5, l. 1 | "claim 4" | should be | -- claim 3 --. |
| Claim 6, l. 1 | "claim 4" | should be | -- claim 3 --. |
| Claim 7, l. 1 | "claim 4" | should be | -- claim 3 --. |
| Claim 9, l. 1 | "claim 7" | should be | -- claim 3 --. |

Signed and Sealed this

Ninth Day of October 1979

[SEAL]

Attest:

RUTH C. MASON
*Attesting Officer*

LUTRELLE F. PARKER
*Acting Commissioner of Patents and Trademarks*